US011218906B2

(12) United States Patent
John Wilson et al.

(10) Patent No.: US 11,218,906 B2
(45) Date of Patent: Jan. 4, 2022

(54) PHASE-NOISE COMPENSATION REFERENCE SIGNAL CONFIGURATION REPORTING AND SIGNALING

(71) Applicant: QUALCOMM INCORPORATED, San Diego, CA (US)

(72) Inventors: Makesh Pravin John Wilson, San Diego, CA (US); Tao Luo, San Diego, CA (US); Jing Jiang, San Diego, CA (US); Sundar Subramanian, San Diego, CA (US); Sony Akkarakaran, Poway, CA (US); Atul Maharshi, South Orange, NJ (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/784,631

(22) Filed: Feb. 7, 2020

(65) Prior Publication Data
US 2020/0178119 A1 Jun. 4, 2020

Related U.S. Application Data

(62) Division of application No. 15/436,531, filed on Feb. 17, 2017, now Pat. No. 10,595,225.
(Continued)

(51) Int. Cl.
*H04W 28/04* (2009.01)
*H04L 27/00* (2006.01)
(Continued)

(52) U.S. Cl.
CPC .......... *H04W 28/04* (2013.01); *H04L 5/0048* (2013.01); *H04L 5/0094* (2013.01);
(Continued)

(58) Field of Classification Search
None
See application file for complete search history.

(56) References Cited

U.S. PATENT DOCUMENTS 7,576,582 B2   8/2009 Lee et al.
8,477,888 B2   7/2013 Lu et al.
(Continued)

FOREIGN PATENT DOCUMENTS

CN   103858360 A   6/2014
CN   104521176 A   4/2015
(Continued)

OTHER PUBLICATIONS

Ericsson: "Verizon 5G TF, Air Interface Working Group, Verizon 5th Generation Radio Access, Physical channels and modulation (Release 1)", TS V5G.211 V1.3 (Jun. 2016), pp. 1-79.
(Continued)

*Primary Examiner* — Mohammed Rachedine
(74) *Attorney, Agent, or Firm* — QUALCOMM Incorporated

(57) ABSTRACT

Methods, systems, and devices for wireless communication are described. A user equipment (UE) may report a phase-noise compensation reference signal (PCRS) configuration to a base station to enable per-UE PCRS signaling. For example, a UE may operate in a wireless communications system using carrier frequencies greater than 6 GHz, which may be affected by phase noise. The UE may accordingly determine a PCRS configuration based on a capability to receive signals. The PCRS configuration may include a resource mapping for one or more PCRS, a number of PCRS ports used for PCRS, a multiplexing scheme for one or more PCRS ports, or the UE's phase noise estimation capability. The UE may then transmit a reporting message including the PCRS configuration to a base station. The base station may
(Continued)

use the PCRS configuration for PCRS transmissions to the UE.

20 Claims, 14 Drawing Sheets

Related U.S. Application Data

(60) Provisional application No. 62/394,180, filed on Sep. 13, 2016.

(51) Int. Cl.
*H04L 5/00* (2006.01)
*H04W 72/04* (2009.01)
*H04W 88/02* (2009.01)

(52) U.S. Cl.
CPC ..... *H04L 27/0014* (2013.01); *H04W 72/0406* (2013.01); *H04W 88/02* (2013.01)

(56) References Cited

U.S. PATENT DOCUMENTS

| | | | |
|---|---|---|---|
| 9,270,270 | B2 | 2/2016 | Cai et al. |
| 9,362,910 | B2 | 6/2016 | Gurumurthy et al. |
| 10,439,663 | B2 | 10/2019 | Islam et al. |
| 10,587,446 | B2 * | 3/2020 | Lee .................... H04L 5/00 |
| 2007/0008024 | A1 | 1/2007 | Cheng et al. |
| 2008/0064353 | A1 | 3/2008 | McBeath et al. |
| 2010/0097151 | A1 | 4/2010 | Arai |
| 2010/0098139 | A1 | 4/2010 | Braithwaite |
| 2014/0050259 | A1 | 2/2014 | Azizi et al. |
| 2014/0119470 | A1 | 5/2014 | Wilson et al. |
| 2014/0169316 | A1 | 6/2014 | Kim et al. |
| 2015/0003356 | A1 | 1/2015 | Seo et al. |
| 2015/0146559 | A1 | 5/2015 | Yamada et al. |
| 2015/0181589 | A1 | 6/2015 | Luo et al. |
| 2016/0211846 | A1 | 7/2016 | Rasouli et al. |
| 2016/0309338 | A1 | 10/2016 | Wang et al. |
| 2017/0141874 | A1 | 5/2017 | Di et al. |
| 2017/0302495 | A1 | 10/2017 | Islam et al. |
| 2018/0041259 | A1 * | 2/2018 | Kim .................... H04L 25/0224 |
| 2018/0077603 | A1 | 3/2018 | John Wilson et al. |
| 2019/0097776 | A1 * | 3/2019 | Kim .................... H04L 27/2611 |
| 2019/0356463 | A1 * | 11/2019 | Zhang .................... H04W 80/08 |
| 2019/0393937 | A1 * | 12/2019 | Kim .................... H04L 25/0204 |

FOREIGN PATENT DOCUMENTS

| | | | | |
|---|---|---|---|---|
| EP | 2711725 A1 | | 3/2014 | |
| EP | 2717621 A1 | | 4/2014 | |
| JP | 2019528004 A | | 10/2019 | |
| KR | 20180101495 A | * | 9/2018 | .......... H04L 5/0007 |
| WO | WO-2015094816 A1 | | 6/2015 | |
| WO | 2017176602 | | 10/2017 | |
| WO | WO-2018027222 A1 | * | 2/2018 | .......... H04L 5/0094 |

OTHER PUBLICATIONS

Intel Corporation: "Study of Phase Noise Tracking", 3GPP Draft; R1-167888, 3rd Generation Partnership Project (3GPP), Mobile Competence Centre; 650, Route Des Lucioles; F-06921 Sophia-Anti Polis Cedex; France, vol. RAN WG1, No. Gothenburg, Sweden; Aug. 21, 2016, XP051140839, Retrieved from the Internet: URL:http://www.3gpp.org/ftp/Meetings_3GPP_SYNC/RAN1/Docs/ [retrieved on Aug. 21, 2016], 9 pages.

International Search Report and Written Opinion—PCT/US2017/046798—ISA/EPO—dated Oct. 20, 2017.

Nokia, et al., "Reference Symbols Types in NR", 3GPP TSG-RAN WG1#86, 3GPP Draft, R1-167290, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 20162016-Aug. 26, 2016, Aug. 21, 2016 (Aug. 21, 2016), XP051125813, Aug. 12, 2016, 3 Pages, Retrieved from the Internet: URL: http://www.3gpp.org/ftp/Meetings_3GPP_SYNC/RAN1/Docs/ [retrieved on Aug. 21, 2016].

Qualcomm Incorporated: "UL MIMO Transmission Schemes", 3GPP TSG-RAN WG1 #86, R1-166380, Gothenberg, Sweden, 20160822-20160826, 4 Pages, Aug. 13, 2016.

* cited by examiner

PHASE-NOISE COMPENSATION REFERENCE SIGNAL CONFIGURATION REPORTING AND SIGNALING

CROSS REFERENCES

The present Application for Patent is a Divisional of U.S. patent application Ser. No. 15/436,531 by John Wilson et al., entitled "PHASE-NOISE COMPENSATION REFERENCE SIGNAL CONFIGURATION REPORTING AND SIGNALING" filed Feb. 17, 2017, which claims priority to U.S. Provisional Patent Application No. 62/394,180 by John Wilson et al., entitled "PHASE-NOISE COMPENSATION REFERENCE SIGNAL CONFIGURATION REPORTING AND SIGNALING," filed Sep. 13, 2016, assigned to the assignee hereof, each of which is hereby expressly incorporated by reference herein in their entirety.

BACKGROUND

The following relates generally to wireless communication, and more specifically to phase-noise compensation reference signal (PCRS) configuration reporting and signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, communication efficiency in wireless communications systems may be directly impacted by interference on transmitted signals. As a result, wireless devices may use reference signals to proactively mitigate interference through channel estimation and phase noise correction. However, depending on the capabilities of a receiving wireless device, such as a UE, frequent transmissions of reference signals may be unnecessary and may result is signaling overhead and an inefficient use of wireless resources.

SUMMARY

The described techniques relate to improved methods, systems, devices, or apparatuses that support PCRS configuration reporting and signaling. Generally, the described techniques provide for reporting a PCRS configuration to a base station to enable per-UE PCRS signaling. For example, a UE may operate in a wireless communications system using carrier frequencies greater than 6 GHz, which may be affected by phase noise. The UE may accordingly determine a PCRS configuration based on a capability to receive signals. The PCRS configuration may include a resource mapping for one or more PCRS, a number of PCRS ports used for PCRS, a multiplexing scheme for one or more PCRS ports, or the UE's phase noise estimation capability. The UE may then transmit a reporting message including the PCRS configuration to a base station. The base station may thus use the PCRS configuration for PCRS transmissions to the UE.

A method of wireless communication is described. The method may include identifying a capability of a UE to receive signals in a communications system using carrier frequencies greater than 6 GHz, determining a PCRS configuration based as least in part on the determined capability, and transmitting, to a base station, a reporting message comprising the determined PCRS configuration.

An apparatus for wireless communication is described. The apparatus may include means for identifying a capability of a UE to receive signals in a communications system using carrier frequencies greater than 6 GHz, means for determining a PCRS configuration based as least in part on the determined capability, and means for transmitting, to a base station, a reporting message comprising the determined PCRS configuration.

Another apparatus for wireless communication is described. The apparatus may include a processor, memory in electronic communication with the processor, and instructions stored in the memory. The instructions may be operable to cause the processor to identify a capability of a UE to receive signals in a communications system using carrier frequencies greater than 6 GHz, determine a PCRS configuration based as least in part on the determined capability, and transmit, to a base station, a reporting message comprising the determined PCRS configuration.

A non-transitory computer readable medium for wireless communication is described. The non-transitory computer-readable medium may include instructions operable to cause a processor to identify a capability of a UE to receive signals in a communications system using carrier frequencies greater than 6 GHz, determine a PCRS configuration based as least in part on the determined capability, and transmit, to a base station, a reporting message comprising the determined PCRS configuration.

Some examples of the method, apparatus, and non-transitory computer-readable medium described above may further include processes, features, means, or instructions for determining a resource mapping pattern for one or more PCRS, wherein the PCRS configuration comprises the determined resource mapping pattern. Some examples of the method, apparatus, and non-transitory computer-readable medium described above may further include processes, features, means, or instructions for determining a number of PCRS ports used for PCRS, wherein the PCRS configuration comprises the determined number of PCRS ports.

Some examples of the method, apparatus, and non-transitory computer-readable medium described above may further include processes, features, means, or instructions for determining a multiplexing scheme used for one or more PCRS ports, wherein the PCRS configuration comprises the determined multiplexing scheme. In some examples of the method, apparatus, and non-transitory computer-readable medium described above, the multiplexing scheme comprises a PCRS precoder corresponding to each of the one or more PCRS ports. In some examples of the method, apparatus, and non-transitory computer-readable medium described above, the one or more PCRS ports may be mapped to respective demodulation reference signal (DMRS) ports. In some examples of the method, apparatus, and non-transitory computer-readable medium described above, the multiplexing scheme comprises the one or more PCRS ports multiplexed onto a single resource.

In some examples of the method, apparatus, and non-transitory computer-readable medium described above, the multiplexing scheme comprises a single PCRS port multiplexed over a set of resources. Some examples of the method, apparatus, and non-transitory computer-readable medium described above may further include processes, features, means, or instructions for determining a phase noise estimation capability, wherein the PCRS configuration comprises the determined phase noise estimation capability.

Some examples of the method, apparatus, and non-transitory computer-readable medium described above may further include processes, features, means, or instructions for identifying a first channel estimate corresponding to a first set of DMRS ports. Some examples of the method, apparatus, and non-transitory computer-readable medium described above may further include processes, features, means, or instructions for identifying a second channel estimate corresponding to a second set of DMRS ports. Some examples of the method, apparatus, and non-transitory computer-readable medium described above may further include processes, features, means, or instructions for generating a superposed channel based at least in part on the first channel estimate and the second channel estimate.

Some examples of the method, apparatus, and non-transitory computer-readable medium described above may further include processes, features, means, or instructions for estimating a phase noise based at least in part on the generated superposed channel and a PCRS multiplexed onto a single resource, wherein the PCRS may be precoded with a same precoder used for a downlink reference signal comprising a DMRS or a UE-specific reference signal (VERS).

Some examples of the method, apparatus, and non-transitory computer-readable medium described above may further include processes, features, means, or instructions for receiving, from the base station, a message comprising an uplink PCRS configuration, wherein the uplink PCRS configuration comprises a resource mapping pattern for transmitting PCRS. Some examples of the method, apparatus, and non-transitory computer-readable medium described above may further include processes, features, means, or instructions for transmitting, to the base station, one or more PCRS based at least in part on the received uplink PCRS configuration.

Some examples of the method, apparatus, and non-transitory computer-readable medium described above may further include processes, features, means, or instructions for determining a UE PCRS configuration, wherein the uplink PCRS configuration comprises a resource mapping pattern for transmitting PCRS. Some examples of the method, apparatus, and non-transitory computer-readable medium described above may further include processes, features, means, or instructions for transmitting, to the base station, a second reporting message comprising the determined uplink PCRS configuration.

Some examples of the method, apparatus, and non-transitory computer-readable medium described above may further include processes, features, means, or instructions for transmitting, to the base station, one or more PCRS based at least in part on the determined uplink PCRS configuration. Some examples of the method, apparatus, and non-transitory computer-readable medium described above may further include processes, features, means, or instructions for receiving a PCRS from the base station in response to the transmitted reporting message.

A method of wireless communication is described. The method may include receiving, from a UE, a reporting message comprising a PCRS configuration and transmitting one or more PCRS based at least in part on the PCRS configuration.

An apparatus for wireless communication is described. The apparatus may include means for receiving, from a UE, a reporting message comprising a PCRS configuration and means for transmitting one or more PCRS based at least in part on the PCRS configuration.

Another apparatus for wireless communication is described. The apparatus may include a processor, memory in electronic communication with the processor, and instructions stored in the memory. The instructions may be operable to cause the processor to receive, from a UE, a reporting message comprising a PCRS configuration and transmit one or more PCRS based at least in part on the PCRS configuration.

A non-transitory computer readable medium for wireless communication is described. The non-transitory computer-readable medium may include instructions operable to cause a processor to receive, from a UE, a reporting message comprising a phase-noise PCRS configuration and transmit one or more PCRS based at least in part on the PCRS configuration.

Some examples of the method, apparatus, and non-transitory computer-readable medium described above may further include processes, features, means, or instructions for determining an uplink PCRS configuration. Some examples of the method, apparatus, and non-transitory computer-readable medium described above may further include processes, features, means, or instructions for transmitting, to the UE, a message comprising the determined uplink PCRS configuration. Some examples of the method, apparatus, and non-transitory computer-readable medium described above may further include processes, features, means, or instructions for receiving, from the UE, one or more PCRS based at least in part on the uplink PCRS configuration.

Some examples of the method, apparatus, and non-transitory computer-readable medium described above may further include processes, features, means, or instructions for receiving, from the UE, a second reporting message comprising an uplink PCRS configuration.

Some examples of the method, apparatus, and non-transitory computer-readable medium described above may further include processes, features, means, or instructions for receiving, from the UE, one or more PCRS based at least in part on the uplink PCRS configuration.

In some examples of the method, apparatus, and non-transitory computer-readable medium described above, the PCRS configuration comprises a resource mapping pattern used for transmitting the one or more PCRS. In some examples of the method, apparatus, and non-transitory computer-readable medium described above, the PCRS configuration comprises a number of PCRS ports used for transmitting the one or more PCRS.

In some examples of the method, apparatus, and non-transitory computer-readable medium described above, the PCRS configuration comprises a multiplexing scheme for one or more PCRS port. In some examples of the method, apparatus, and non-transitory computer-readable medium described above, the multiplexing scheme comprises a PCRS precoder corresponding to each of the one or more PCRS ports.

In some examples of the method, apparatus, and non-transitory computer-readable medium described above, PCRS precoder may be a same precoder used for a downlink reference signal comprising a DMRS or a VERS. In some examples of the method, apparatus, and non-transitory computer-readable medium described above, the one or more PCRS ports may be mapped to respective DMRS ports. In some examples of the method, apparatus, and non-transitory computer-readable medium described above, the multiplexing scheme comprises the one or more PCRS ports multiplexed onto a single resource.

In some examples of the method, apparatus, and non-transitory computer-readable medium described above, the multiplexing scheme comprises the one or more PCRS ports multiplexed across two or more UEs. In some examples of the method, apparatus, and non-transitory computer-readable medium described above, the multiplexing scheme comprises a single PCRS port multiplexed over a set of resources.

DETAILED DESCRIPTION

Figure 1:
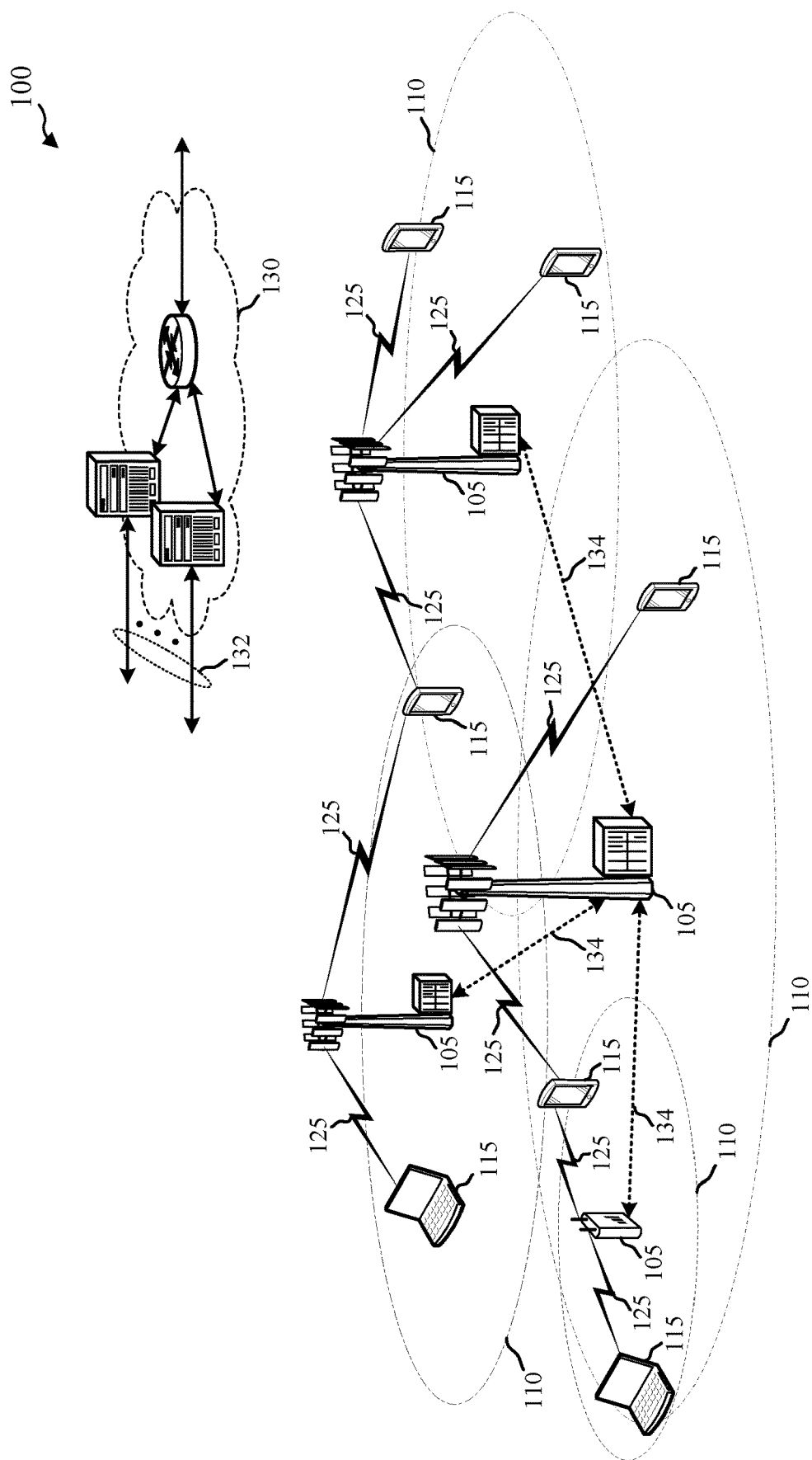
FIG. 1 illustrates an example of a wireless communications system that supports PCRS configuration reporting and signaling in accordance with aspects of the present disclosure.

In some wireless communications systems, phase noise may have an impact on communications performance. For example, phase noise levels may increase with higher carrier frequencies, and wireless communications systems that use carrier frequencies above 6 GHz may thus be affected by relatively more phase noise. Accordingly, a reference signal, such as a PCRS, may be transmitted by a base station and used to estimate and correct phase noise at a receiver, such as a UE. However, in some example, the transmission of PCRS may result in unnecessary signaling overhead.

In some cases, a UE may send a reporting message to a base station that includes a PCRS configuration based on the UE's capability to receive signals. For example, different UEs may have different PCRS overhead or performance parameters associated with receiver implementation and UE capabilities. As a result, a UE may transmit a reporting message that includes a PCRS configuration to a base station, where the PCRS configuration may include a preferred number of PCRS ports and wireless resources used for PCRS. The PCRS configuration reported by the UE may enable the ability to tradeoff between performance and overhead using a per-UE matched allocation of PCRS.

A PCRS configuration reported by a UE may include a resource mapping for PCRS, such as a mapping of PCRS to an identified resource (or set or resources) may be a function of frequency (e.g., a resource element (RE) location) or time (e.g., a certain orthogonal frequency division multiplexed (OFDM) symbol). In some cases, the UE may indicate a determined number of PCRS ports using the PCRS configuration. For instance, the UE may transmit a PCRS configuration that corresponds to the use of one or multiple PCRS ports for a number of resources (e.g., REs). Additionally or alternatively, a multiplexing scheme for PCRS ports may be included in the PCRS configuration. The multiplexing scheme may include a determined precoding for multiplexing PCRS ports, where multiple PCRS ports may be multiplexed onto the same resources. In some cases, the PCRS configuration may include an indication of the UE's ability to estimate phase noise when two or more PCRS ports for multiple UEs are superposed on the same resources.

Upon receipt of the reporting message that include the PCRS configuration, a base station may signal a configured PCRS pattern to one or more UEs that are associated with the base station. In some cases, the base station may signal the PCRS to the UE via a control channel, such as a physical downlink control channel (PDCCH). Additionally or alternatively, the base station may use radio resource control (RRC) signaling to transmit a PCRS configuration to the UE.

In some cases, a UE may receive an uplink PCRS configuration (e.g., a PCRS configuration used by UEs for uplink transmissions). That is, a base station may request that a certain PCRS resource mapping pattern be used by the UE, and the UE may send one or more PCRS to the base station using the received uplink PCRS configuration. In some cases, the UE may determine an appropriate uplink PCRS configuration for uplink transmissions, and report the uplink PCRS configuration to the base station.

Aspects of the disclosure are initially described in the context of a wireless communications system. Aspects of the disclosure are further illustrated by and described with reference to apparatus diagrams, system diagrams, and flowcharts that relate to PCRS configuration reporting and signaling.

FIG. 1 illustrates an example of a wireless communications system 100 in accordance with various aspects of the present disclosure. The wireless communications system 100 includes base stations 105, UEs 115, and a core network 130. Wireless communications system 100 may enable per-UE signaling of PCRS via reporting of a PCRS configuration by UEs 115. For example, one or more UEs 115 may report a PCRS configuration to a base station 105 to dynamically configure PCRS transmissions based on a receiver implementation.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A PDCCH carries a message known as downlink control information (DCI), which includes transmission resource assignments and other control information for a UE 115 or group of UEs 115. PDCCH may carry DCI in at least one control channel elements (CCE), which may consist of nine logically contiguous resource element groups (REGs), where each REG contains 4 resource elements. DCI includes information regarding DL scheduling assignments, uplink (UL) resource grants, transmission scheme, UL power control, hybrid automatic repeat request (HARD) information, modulation and coding scheme (MCS) and other information.

Similarly, for a system that employs multiple-input multiple-output (MIMO), the DCI must include additional signaling information. DCI size and format depend on the amount of information as well as factors such as bandwidth, the number of antenna ports, and duplexing mode. PDCCH can carry DCI messages associated with multiple users, and each UE 115 may decode the DCI messages that are intended for it. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may include user-specific control information.

Wireless communications system 100 may include an radio link control (RLC) layer that connects higher layers (e.g., RRC and packet data convergence protocol (PDCP)) to the lower layers (e.g., the medium access control (MAC) layer). An RLC entity in a base station 105 or a UE 115 may ensure that transmission packets are organized into appropriately sized blocks (corresponding to the MAC layer transport block size). If an incoming data packet (i.e., a PDCP or RRC service data unit (SDU)) is too large for transmission, the RLC layer may segment it into several smaller RLC protocol data units (PDUs). If the incoming packets are too small, the RLC layer may concatenate several of them into a single, larger RLC PDU. Each RLC PDU may include a header including information about how to reassemble the data. The RLC layer may also ensure that packets are reliably transmitted.

A reference signal (RS) may be a signal, known to a receiving device, that is inserted into a transmitted signal in order to facilitate channel estimation for coherent demodulation and measurements. In the downlink, cell-specific RSs may be available to all UEs 115 in a cell; UE-specific RSs may be embedded in the data for specific UEs 115, and multimedia broadcast single frequency network (MBSFN)-specific RSs are provided in case of MBSFN operation. These RSs occupy specified REs within an OFDM symbol.

Wireless communications system 100 may operate using frequency ranges greater than 6 GHz. For instance, wireless communications system 100 may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Additionally, phase noise may have an impact on communications performance at frequency ranges higher than 6 GHz. For example, phase noise levels may increase with higher carrier frequencies, and wireless communications systems that use carrier frequencies above 6 GHz may thus be affected by relatively more phase noise. Accordingly, a reference signal, such as a PCRS, may be transmitted by a base station 105 and used to estimate and correct phase noise at a UE 115, or vice versa.

Thus, wireless communications system 100 may support UEs 115 reporting a PCRS configuration to a base station 105 to enable a per-UE PCRS signaling. For example, a UE 115 may operate in wireless communications system 100 using carrier frequencies greater than 6 GHz, which may be affected by phase noise. The UE 115 may accordingly determine a PCRS configuration based on a capability to receive signals. The PCRS configuration may include a resource mapping for one or more PCRS, a number of PCRS ports used for PCRS, a multiplexing scheme for one or more PCRS ports, or the phase noise estimation capability of the UE 115. The UE 115 may then transmit a reporting message including the PCRS configuration to a base station. The base station 105 may then use the PCRS configuration for PCRS transmissions to the UE 115.

Figure 2:
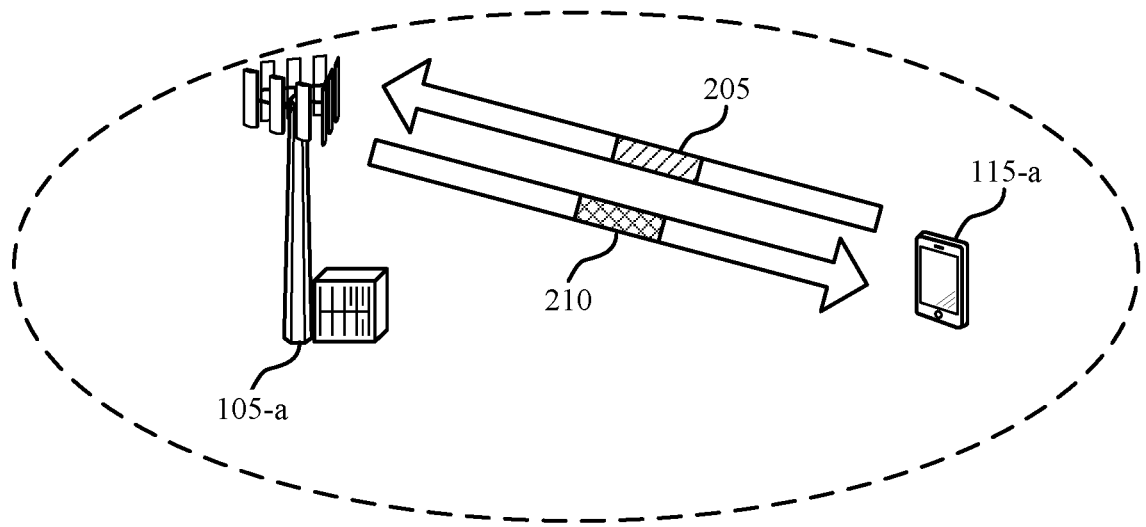
FIG. 2 illustrates an example of a wireless communications system that supports PCRS configuration reporting and signaling in accordance with aspects of the present disclosure.

FIG. 2 illustrates an example of a wireless communications system 200 that supports PCRS configuration reporting and signaling. Wireless communications system 200 may include base station 105-a and UE 115-a, which may be examples of the corresponding devices described with reference to FIG. 1. Wireless communications system may be an example of a system that enables a tradeoff between performance and overhead by using a per-UE matched allocation of PCRS through the transmission of a PCRS configuration from a UE 115.

Wireless communications system 200 may operate at frequencies above 6 GHz, and may thus be affected by phase noise. As a result, a reference signal, such as a PCRS, may be transmitted by base station 105-a and used to estimate and correct phase noise at a receiver, such as UE 115-a. In some cases, UE 115-a may send a reporting message 205 to base station 105-a that includes a PCRS configuration based on a capability of UE 115-a to receive signals. For example, different UEs 115 may have different PCRS overhead or performance parameters associated with receiver implementation and UE capabilities. As a result, UE 115-a may transmit reporting message 205 that includes a PCRS configuration to base station 105-*a*, where the PCRS configuration indicates a preferred number of PCRS ports and/or wireless resources used for PCRS. The PCRS configuration reported by UE 115-*a* may enable the ability to tradeoff between performance and overhead using a per-UE matched allocation of PCRS.

The reporting message 205 including the PCRS configuration may be transmitted by UE 115-*a* via RRC resources at a number of different time scales. For instance, the PCRS configuration may be transmitted on a relatively long time scale (e.g., less frequently), or may be transmitted on a shorter time scale (e.g., more frequently) via a control channel (such as a physical uplink shared channel (PUSCH) or a physical uplink control channel (PUCCH)).

In some cases, UE 115-*a* may require PCRS more or less frequently than other UEs 115 (e.g., every OFDM symbol instead of every few OFDM symbols, etc.). Accordingly, a PCRS configuration reported by a UE 115 may include a resource mapping for PCRS. For example, the mapping of PCRS to an identified resource (or set or resources) may be a function of frequency (e.g., a RE location) or time (e.g., a certain OFDM symbol). In some cases, UE 115-*a* may report a PCRS configuration that indicates a PCRS periodicity, such as PCRS every N OFDM symbols, where N may be 1, 2, 3, etc. In some cases, UE 115-*a* may report a pattern (such as pattern that is a function of frequency and time) using a table of possible patterns for PCRS transmissions.

UE 115-*a* may indicate a determined number of PCRS ports using the PCRS configuration, where the number of PCRS ports may be different than a number of demodulation reference signal (DMRS) ports allocated to UE 115-*a*. As an example, if a receiver implementation at UE 115-*a* is such that the phase noise is the same across multiple antennas, then UE 115-*a* may only need one PCRS port (e.g., a PCRS port that is mapped to a DMRS port) to recover a phase error. In another example, UE 115-*a* may include a receiver implementation such that the phase noise is different across multiple antennas, and for multi-layer transmissions (e.g., transmissions using more than one transmission layer), UE 115-*a* may indicate multiple PCRS ports instead of a single PCRS port. In such cases, the use of multiple PCRS ports may result in robust phase estimation at UE 115-*a*. For example, if only a single port is used, but the channel from the chosen port to a UE antenna is relatively weak, then the phase noise estimate for that particular UE antenna may be impacted.

In some cases, UE 115-*a* may report a multiplexing scheme for PCRS ports over resources in the PCRS configuration. The multiplexing scheme may include a determined precoding for multiplexing PCRS ports, where multiple PCRS ports may be multiplexed onto the same resources. For example, UE 115-*a* may request two PCRS ports be used, and may also request how the two ports are multiplexed over one or more resources. In such cases, the two PCRS ports may be mapped to a different number of resources. UE 115-*a* may choose to reduce signaling overhead and indicate, in a PCRS configuration sent via reporting message 205, that both PCRS ports may be multiplexed on the same resources with a certain precoding. Alternatively, if the receiver phase noise is different for the two antennas, using one PCRS port may not be sufficient to recover the channel for one of the UE antennas. However, if the PCRS ports are multiplexed, such that both PCRS ports are transmitting in the same resources, then the phase noise for each antenna may be recovered. In such cases, an effective channel may be $I_{2 \times 2}$, with two port transmission and two receiving antennas. In some examples, UE 115-*a* may indicate a multiplexing scheme that corresponds to a single PCRS port multiplexed over multiple resources to obtain a processing gain for phase noise estimation. Additionally or alternatively, the multiplexing scheme may include one or more PCRS ports multiplexed across multiple UEs 115 (e.g., not just one UE 115). In some cases, each PCRS port may be mapped to a DMRS port.

In some cases, the reporting message 205 may include an indication of a capability of UE 115-*a* to estimate phase noise when two or more PCRS ports for multiple UEs 115 are superposed on the same resources. For example, for multiple user (MU)-MIMO transmissions, individual DMRS precoding may be used for each UE 115 in communication with base station 105-*a*. PCRS may also be precoded with a same precoder that is used for another downlink reference signal, such as a DMRS or a UE-specific reference signal (UERS) precoder for each transmission layer and for each UE 115. As a result, there may be a superposition of PCRS ports, and UE 115-*a* may be able to identify multiple PCRS ports multiplexed onto the same resources.

As an example, UE 115-*a* may use a first set of DMRS ports (e.g., DMRS port 0 and DMRS port 1), and may obtain a corresponding channel estimate using the first set of DMRS ports. UE 115-*a* may also estimate an interfering channel caused by transmissions to another UE 115 (not shown). For instance, UE 115-*a* can use a second set of DMRS ports (e.g., DMRS port 2 and DMRS port 3) to obtain this channel estimate for the interfering channel. UE 115-*a* may then combine the two channel estimates to obtain a superposed channel. If multiple PCRS ports (e.g., PCRS ports 0, 1, 2, and 3 (corresponding to DMRS ports 0, 1, 2, and 3)) are multiplexed in a single RE, then UE 115-*a* may use the PCRS RE and compare with the superposed DMRS channel to obtain the phase noise. In such cases, the UE 115-*a* may generate a channel estimate using a DMRS for different UEs 115 and may also synthesize the superposition channel at a DMRS symbol (e.g., a first symbol), and use this and the superposed PCRS (e.g., at a second symbol) to estimate a phase difference. That is, the UE 115-*a* may take the difference between PCRS for multiple UEs 115 to obtain a phase difference used for correcting phase noise.

Upon receipt of the reporting message 205 that include the PCRS configuration, base station 105-*a* may signal a configured PCRS 210 to one or more UEs 115 that are associated with base station 105-*a*. In some cases, base station 105-*a* may receive the reporting message 205 that includes the PCRS configuration, and may optimize a PCRS configuration based on the reporting message 205. Additionally or alternatively, base station 105-*a* may identify and transmit PCRS based on a MCS, where the MCS may describe the information data rate of transmissions between base station 105-*a* and UE 115-*a*. The MCS may include, for example, a modulation order and a code rate of transmissions between base station 105-*a* and UE 115-*a*. Base station 105-*a* may transmit PCRS to UE 115-*a* differently for different MCSs. For instance, an MCS may indicate 64 quadrature amplitude modulation (64QAM), which may, for example, be associated with more frequent transmissions of PCRS than another modulation scheme, such as quadrature phase shift keying (QPSK). Base station 105-*a* may signal the PCRS configuration to UE 115-*a* via a control channel, such as a PDCCH. Additionally or alternatively, base station 105-*a* may use RRC signaling to transmit the PCRS configuration to UE 115-*a*.

In some cases, a UE 115-a may receive an uplink PCRS configuration (e.g., a PCRS configuration used by UEs 115 for uplink transmissions). That is, base station 105-a may request that a certain PCRS resource mapping pattern be used by UE 115-a, and UE 115-a may send one or more PCRS to base station 105-a using the received uplink PCRS configuration. As an example, base station 105-a may request more PCRS per RE be transmitted by UE 115-a when a receiver at base station 105-a is experiencing relatively high phase noise. Additionally or alternatively, UE 115-a may determine an appropriate uplink PCRS configuration for uplink transmissions, and report the uplink PCRS configuration to base station 105-a. For instance, UE 115-a may be impacted by high transmission phase noise, and UE 115-a may determine that PCRS may be transmitted more frequently.

Figure 3:
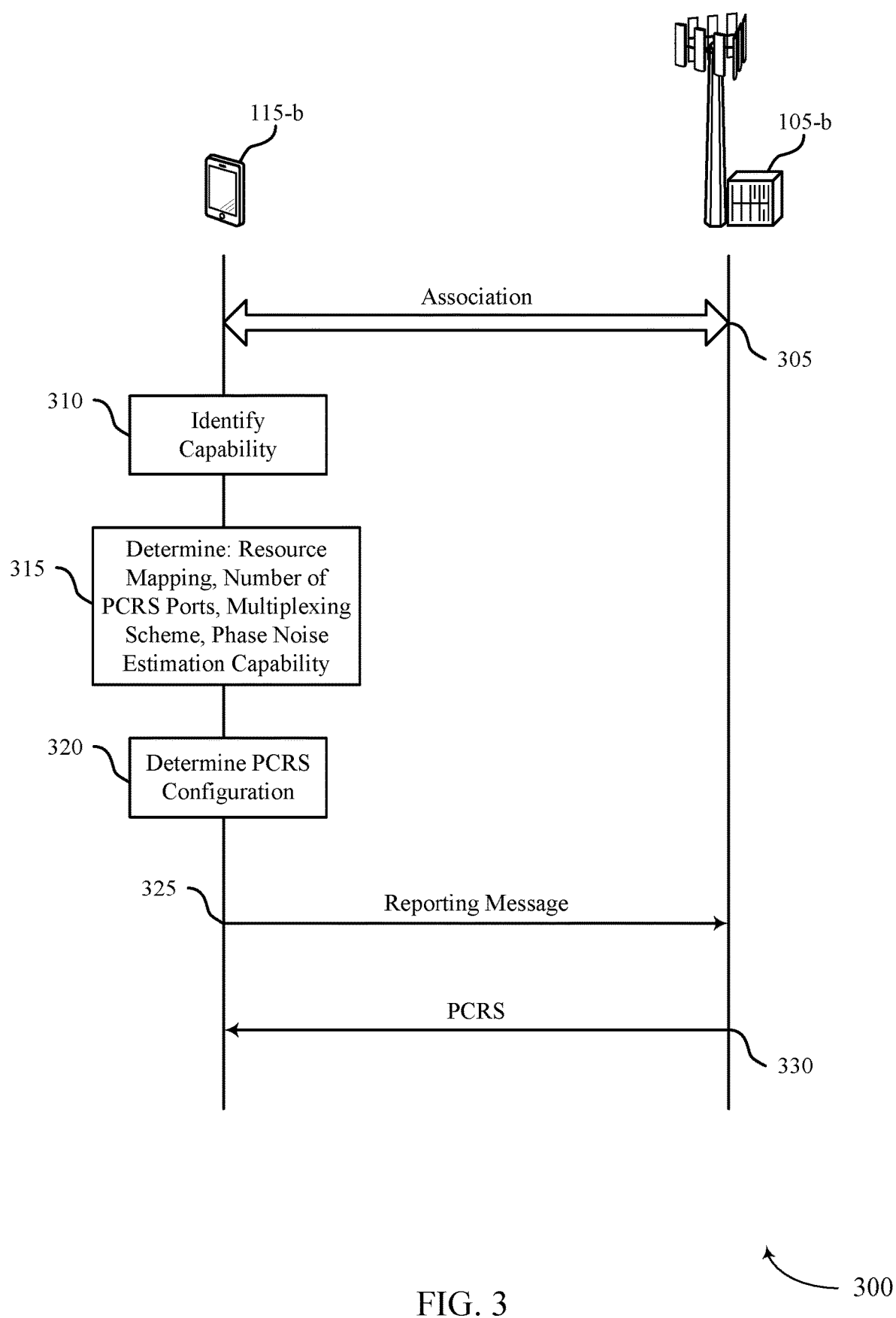
FIG. 3 illustrates an example of a process flow in a system that supports PCRS configuration reporting and signaling in accordance with aspects of the present disclosure.

FIG. 3 illustrates an example of a process flow 300 in a system that supports PCRS configuration reporting and signaling. Process flow 500 may include a UE 115-b and a base station 105-b, which may be examples of the corresponding devices described with reference to FIGS. 1 and 2.

At step 305, UE 115-b and base station 105-b may associate with each other for communication. In some cases, UE 115-b and base station 105-b may operate in a wireless communications system using carrier frequencies greater than 6 GHz, such as a communications system using mmW frequencies. At step 310, UE 115-b may identify a capability to receive signals in the wireless communications system. That is, different UEs 115 may have different capabilities based on a receiver implementation, and UE 115-b may identify a capability to receive signals in the wireless communications system.

At step 315, UE 115-b may determine a resource mapping pattern for one or more PCRS, a number of PCRS ports used for PCRS, a multiplexing scheme used for one or more PCRS ports, a phase noise estimation capability, or any combination thereof. In some cases, the multiplexing scheme includes a PCRS precoder corresponding to each of the one or more PCRS ports, and the one or more PCRS ports may be mapped to respective DMRS ports. In some examples, the multiplexing scheme includes the one or more PCRS ports multiplexed onto a single resource. Additionally or alternatively, the multiplexing scheme includes a single PCRS port multiplexed over a set of resources. In some cases, the multiplexing scheme includes the one or more PCRS ports multiplexed across two or more UEs 115, as opposed to a single UE 115.

At step 320, UE 115-b may determine a PCRS configuration based on the capability. For example, UE 115-b may have a certain receiver implementation and may determine the PCRS configuration based on the receiver implementation. The PCRS configuration may include the determined resource mapping pattern, the determined number of PCRS ports, the determined multiplexing scheme, the determined phase noise estimation capability, or any combination thereof.

In some examples, UE 115-b may identify a first channel estimate corresponding to a first set of DMRS ports and identify a second channel estimate corresponding to a second set of DMRS ports. UE 115-b may then generate a superposed channel based on the first channel estimate and the second channel estimate and estimate a phase noise based on the generated superposed channel and a PCRS multiplexed onto a single resource. In some cases, the PCRS may be precoded with a same precoder used for a downlink reference signal, such as a DMRS or a VERS.

At step 325, UE 115-b may transmit, to base station 105-b, a reporting message that includes the PCRS configuration. In response to the reporting message, UE 115-b may receive a PCRS from base station 105-b at step 330. In some cases, UE 115-b may receive one or more PCRS from base station 105-b based on an MCS.

Figure 4:
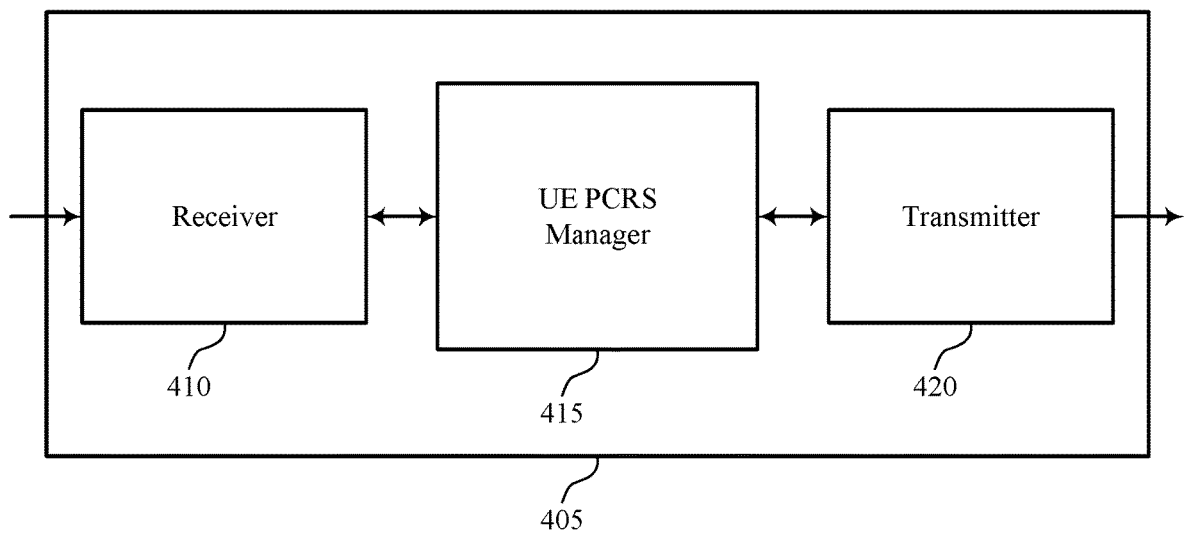
FIGS. 4 through 6 show block diagrams of a device that supports PCRS configuration reporting and signaling in accordance with aspects of the present disclosure.

FIG. 4 shows a block diagram 400 of a wireless device 405 that supports PCRS configuration reporting and signaling in accordance with various aspects of the present disclosure. Wireless device 405 may be an example of aspects of a UE 115 as described with reference to FIG. 1. Wireless device 405 may include receiver 410, UE PCRS manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to PCRS configuration reporting and signaling, etc.). Information may be passed on to other components of the device. The receiver 410 may be an example of aspects of the transceiver 735 described with reference to FIG. 7. In some cases, receiver 410 may receive a PCRS from a base station 105 in response to the transmitted reporting message. Additionally or alternatively, receiver 410 may receive one or more PCRS from a base station 105 based on an MCS.

UE PCRS manager 415 may be an example of aspects of the UE PCRS manager 715 described with reference to FIG. 7. UE PCRS manager 415 may identify a capability of the UE 115 to receive signals in a communications system using carrier frequencies greater than 6 GHz, determine a PCRS configuration based as least in part on the identified capability, and transmit, to a base station 105, a reporting message including the determined PCRS configuration.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
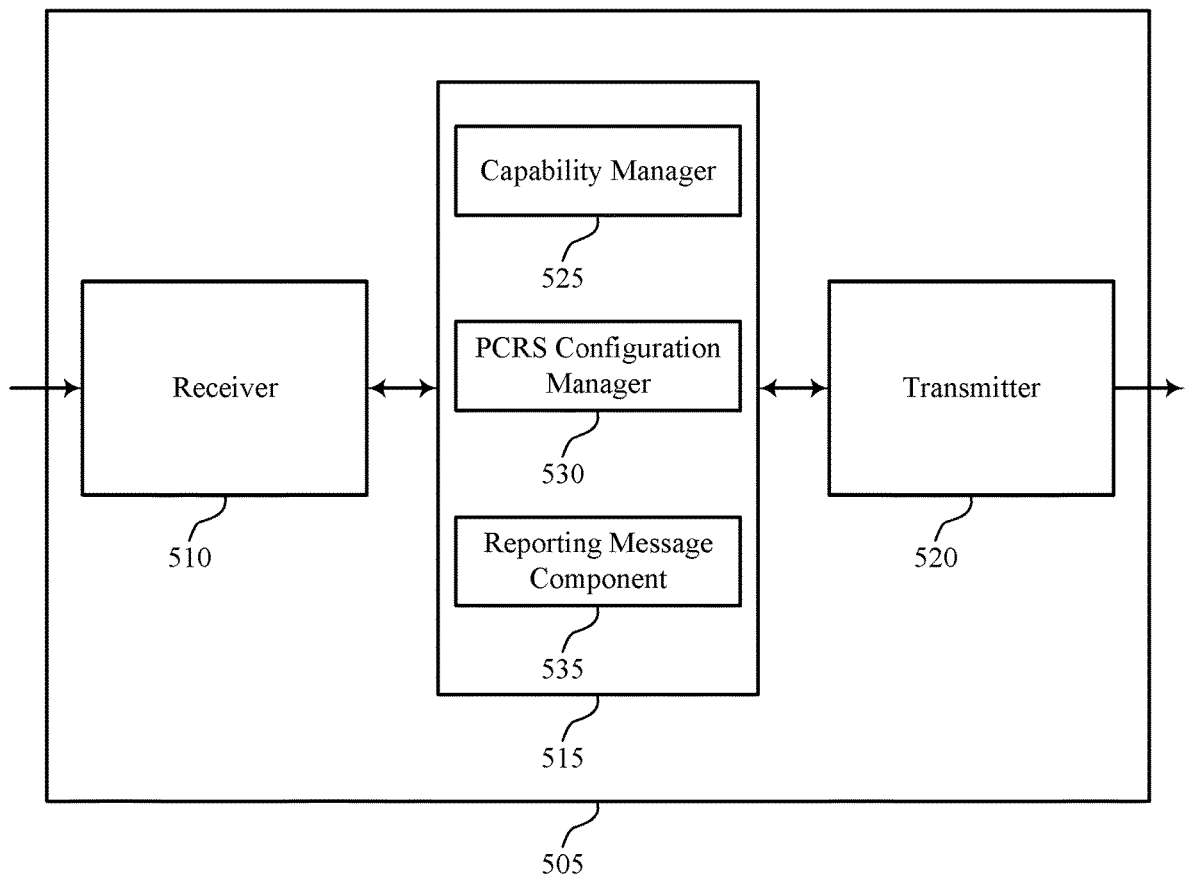

FIG. 5 shows a block diagram 500 of a wireless device 505 that supports PCRS configuration reporting and signaling in accordance with various aspects of the present disclosure. Wireless device 505 may be an example of aspects of a wireless device 405 or a UE 115 as described with reference to FIGS. 1 and 4. Wireless device 505 may include receiver 510, UE PCRS manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to PCRS configuration reporting and signaling, etc.). Information may be passed on to other components of the device. The receiver 510 may be an example of aspects of the transceiver 735 described with reference to FIG. 7.

UE PCRS manager 515 may be an example of aspects of the UE PCRS manager 715 described with reference to FIG. 7. UE PCRS manager 515 may also include capability manager 525, PCRS configuration manager 530, and reporting message component 535. Capability manager 525 may identify a capability of the UE 115 to receive signals in a communications system using carrier frequencies greater than 6 GHz.

PCRS configuration manager 530 may determine a PCRS configuration based as least in part on the identified capability and determine a resource mapping pattern for one or more PCRS, where the PCRS configuration includes the determined resource mapping pattern. In some examples, PCRS configuration manager 530 may determine a number of PCRS ports used for PCRS, where the PCRS configuration includes the determined number of PCRS ports, and determine a multiplexing scheme used for one or more PCRS ports, where the PCRS configuration includes the determined multiplexing scheme. Additionally or alternatively, PCRS configuration manager 530 may determine a phase noise estimation capability, where the PCRS configuration includes the determined phase noise estimation capability.

In some cases, the multiplexing scheme includes a PCRS precoder corresponding to each of the one or more PCRS ports. In some cases, the one or more PCRS ports are mapped to respective DMRS ports. In some cases, the multiplexing scheme includes the one or more PCRS ports multiplexed onto a single resource. In some cases, the multiplexing scheme includes a single PCRS port multiplexed over a set of resources.

In some cases, PCRS configuration manager 530 may receive, from the base station 105, a message including an uplink PCRS configuration, where the uplink PCRS configuration includes a resource mapping pattern for transmitting PCRS. In some examples, PCRS configuration manager 530 may transmit, to the base station 105, one or more PCRS based on the received uplink PCRS configuration. Additionally or alternatively, PCRS configuration manager 530 may determine an uplink PCRS configuration, where the uplink PCRS configuration includes a resource mapping pattern for transmitting PCRS. In some examples, PCRS configuration manager 530 may transmit, to the base station 105, a second reporting message including the determined uplink PCRS configuration and transmit, to the base station 105, one or more PCRS based on the determined uplink PCRS configuration. Reporting message component 535 may transmit, to a base station 105, a reporting message including the determined PCRS configuration.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
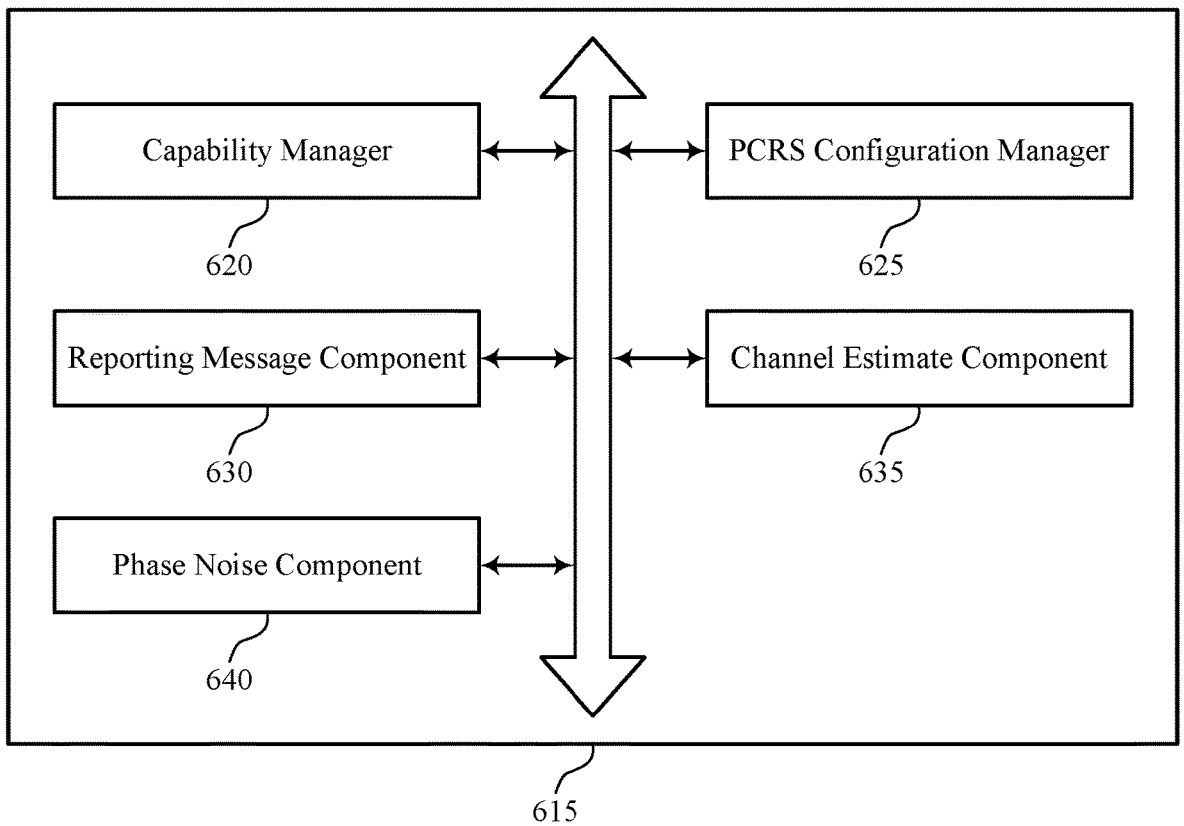

FIG. 6 shows a block diagram 600 of a UE PCRS manager 615 that supports PCRS configuration reporting and signaling in accordance with various aspects of the present disclosure. The UE PCRS manager 615 may be an example of aspects of a UE PCRS manager 415, a UE PCRS manager 515, or a UE PCRS manager 715 described with reference to FIGS. 4, 5, and 7. The UE PCRS manager 615 may include capability manager 620, PCRS configuration manager 625, reporting message component 630, channel estimate component 635, and phase noise component 640. Each of these modules may communicate, directly or indirectly, with one another (e.g., via one or more buses).

Capability manager 620 may identify a capability of the UE 115 to receive signals in a communications system using carrier frequencies greater than 6 GHz. PCRS configuration manager 625 may determine a PCRS configuration based as least in part on the identified capability. In some cases, PCRS configuration manager 625 may determine a resource mapping pattern for one or more PCRS, where the PCRS configuration includes the determined resource mapping pattern. In some cases, PCRS configuration manager 625 may determine a number of PCRS ports used for PCRS, where the PCRS configuration includes the determined number of PCRS ports. Additionally or alternatively, PCRS configuration manager 625 may determine a multiplexing scheme used for one or more PCRS ports, where the PCRS configuration includes the determined multiplexing scheme, and determine a phase noise estimation capability, where the PCRS configuration includes the determined phase noise estimation capability.

In some cases, the multiplexing scheme includes a PCRS precoder corresponding to each of the one or more PCRS ports. In some cases, the one or more PCRS ports are mapped to respective DMRS ports. In some cases, the multiplexing scheme includes the one or more PCRS ports multiplexed onto a single resource. In some cases, the multiplexing scheme includes a single PCRS port multiplexed over a set of resources.

In some cases, PCRS configuration manager 625 may receive, from the base station 105, a message including an uplink PCRS configuration, wherein the uplink PCRS configuration includes a resource mapping pattern for transmitting PCRS. In some cases, PCRS configuration manager 625 may transmit, to the base station 105, one or more PCRS based on the received uplink PCRS configuration. Additionally or alternatively, PCRS configuration manager 625 may determine an uplink PCRS configuration, wherein the uplink PCRS configuration includes a resource mapping pattern for transmitting PCRS. PCRS configuration manager 625 may also transmit, to the base station 105, a second reporting message including the determined uplink PCRS configuration and transmit, to the base station 105, one or more PCRS based on the determined uplink PCRS configuration.

Reporting message component 630 may transmit, to a base station, a reporting message including the determined PCRS configuration. Channel estimate component 635 may identify a first channel estimate corresponding to a first set of DMRS ports, identify a second channel estimate corresponding to a second set of DMRS ports, and generate a superposed channel based on the first channel estimate and the second channel estimate. Phase noise component 640 may estimate a phase noise based on the generated superposed channel and a PCRS multiplexed onto a single resource, where the PCRS is precoded with a same precoder used for a downlink reference signal including a DMRS or a UERS.

Figure 7:
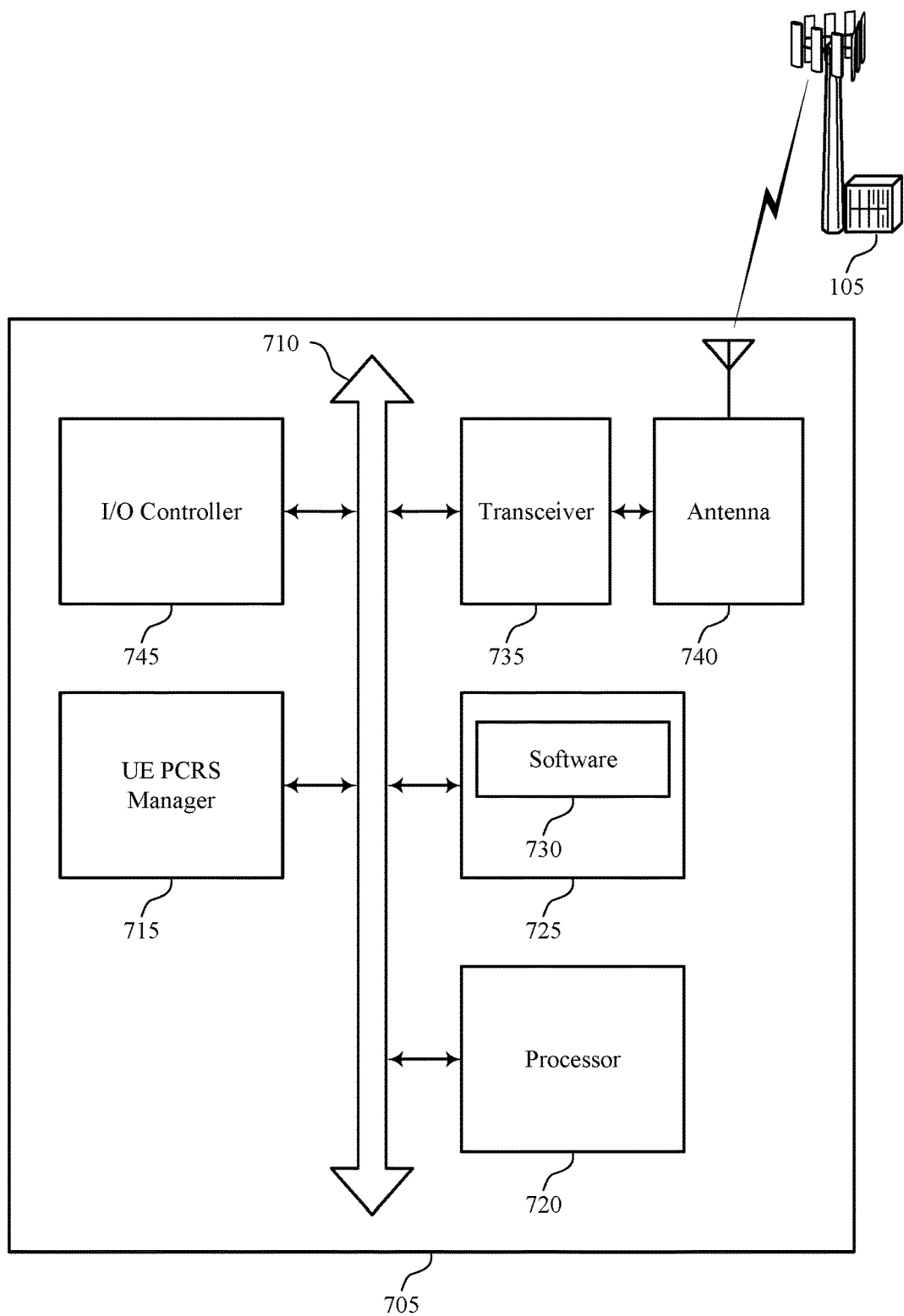
FIG. 7 illustrates a block diagram of a system including a UE that supports PCRS configuration reporting and signaling in accordance with aspects of the present disclosure.

FIG. 7 shows a diagram of a system 700 including a device 705 that supports PCRS configuration reporting and signaling in accordance with various aspects of the present disclosure. Device 705 may be an example of or include the components of wireless device 405, wireless device 505, or a UE 115 as described above, e.g., with reference to FIGS. 1, 4 and 5. Device 705 may include components for bi-directional voice and data communications including components for transmitting and receiving communications, including UE PCRS manager 715, processor 720, memory 725, software 730, transceiver 735, antenna 740, and input/output (I/O) controller 745. These components may be in electronic communication via one or more busses (e.g., bus 710). Device 705 may communicate wirelessly with one or more base stations 105.

Processor 720 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting PCRS configuration reporting and signaling).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support PCRS configuration reporting and signaling. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system.

Figure 8:
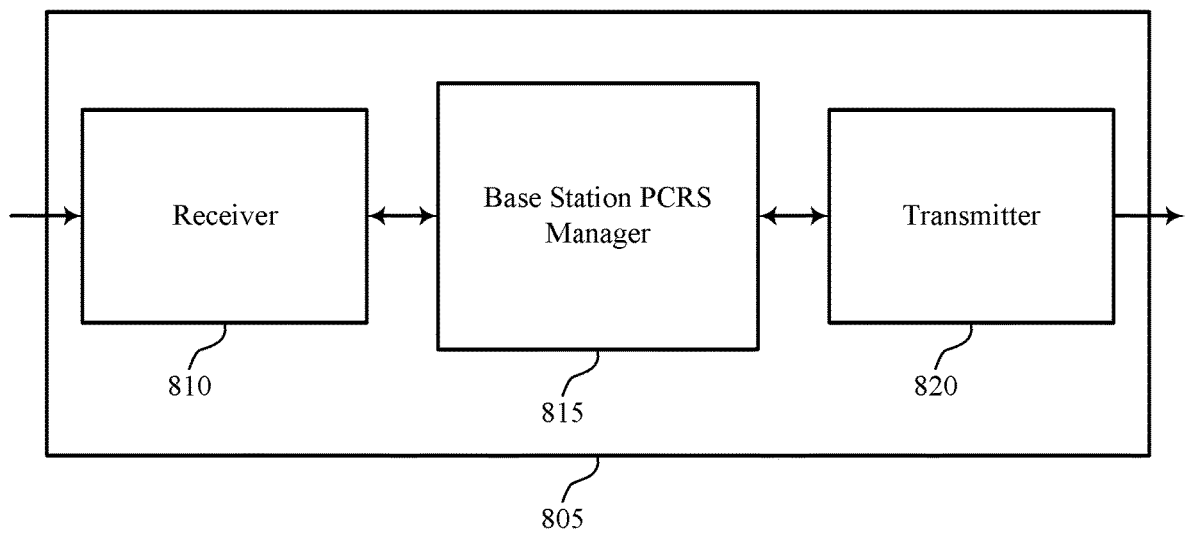
FIGS. 8 through 10 show block diagrams of a device that supports PCRS configuration reporting and signaling in accordance with aspects of the present disclosure.

FIG. 8 shows a block diagram 800 of a wireless device 805 that supports PCRS configuration reporting and signaling in accordance with various aspects of the present disclosure. Wireless device 805 may be an example of aspects of a base station 105 as described with reference to FIG. 1. Wireless device 805 may include receiver 810, base station PCRS manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to PCRS configuration reporting and signaling, etc.). Information may be passed on to other components of the device. The receiver 810 may be an example of aspects of the transceiver 1135 described with reference to FIG. 11.

Base station PCRS manager 815 may be an example of aspects of the base station PCRS manager 1115 described with reference to FIG. 11. Base station PCRS manager 815 may receive, from a UE 115, a reporting message including a PCRS configuration and transmit one or more PCRS based on the PCRS configuration.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
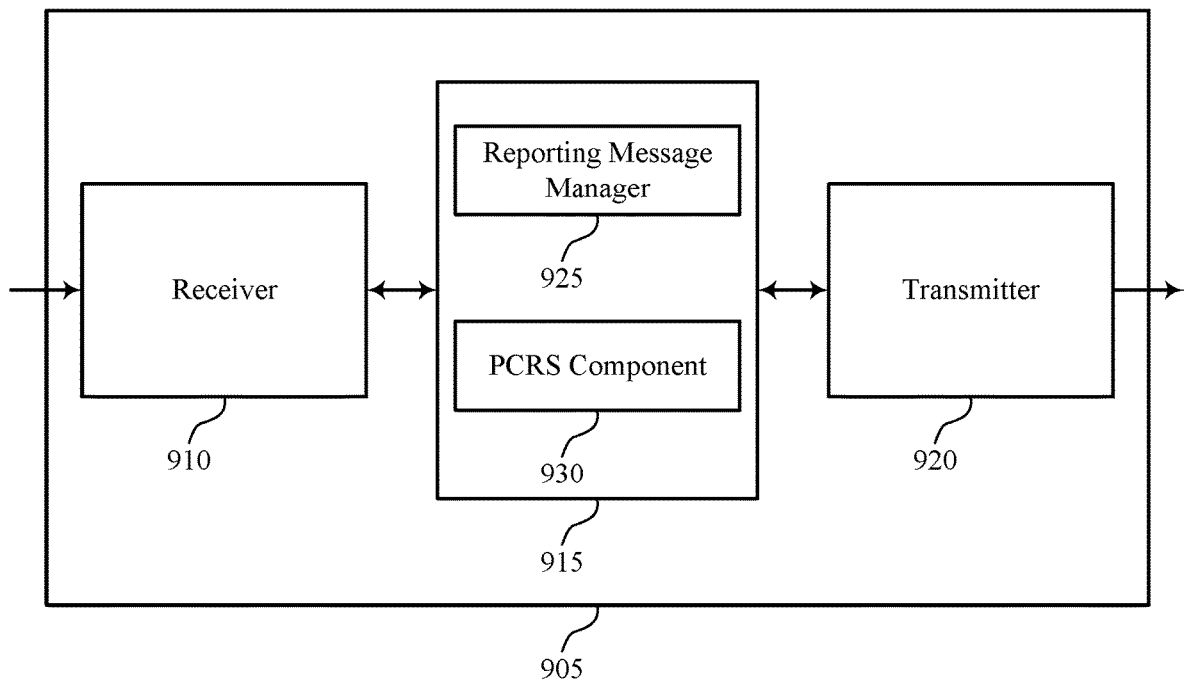

FIG. 9 shows a block diagram 900 of a wireless device 905 that supports PCRS configuration reporting and signaling in accordance with various aspects of the present disclosure. Wireless device 905 may be an example of aspects of a wireless device 805 or a base station 105 as described with reference to FIGS. 1 and 8. Wireless device 905 may include receiver 910, base station PCRS manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to PCRS configuration reporting and signaling, etc.). Information may be passed on to other components of the device. The receiver 910 may be an example of aspects of the transceiver 1135 described with reference to FIG. 11.

Base station PCRS manager 915 may be an example of aspects of the base station PCRS manager 1115 described with reference to FIG. 11. Base station PCRS manager 915 may also include reporting message manager 925 and PCRS component 930. Reporting message manager 925 may receive, from a UE 115, a reporting message including a PCRS configuration.

PCRS component 930 may transmit one or more PCRS based on the PCRS configuration. Additionally or alternatively, PCRS component 930 may identify an MCS, and transmit one or more PCRS based on the identified MCS. In some cases, the PCRS configuration includes a resource mapping pattern used for transmitting the one or more PCRS. In some cases, the PCRS configuration includes a number of PCRS ports used for transmitting the one or more PCRS. In some cases, the PCRS configuration includes a multiplexing scheme for one or more PCRS port. In some cases, the multiplexing scheme includes a PCRS precoder corresponding to each of the one or more PCRS ports. In some cases, the PCRS precoder is a same precoder used for a downlink reference signal including a DMRS or a UERS. In some cases, the one or more PCRS ports are mapped to respective DMRS ports. In some cases, the multiplexing scheme includes the one or more PCRS ports multiplexed onto a single resource. In some cases, the multiplexing scheme includes the one or more PCRS ports multiplexed across two or more UEs 115. In some cases, the multiplexing scheme includes a single PCRS port multiplexed over a set of resources.

PCRS component 930 may determine an uplink PCRS configuration, transmit, to the UE 115, a message including the determined uplink PCRS configuration, and receive, from the UE 115, one or more PCRS based on the uplink PCRS configuration. In some cases, PCRS component 930 may receive, from the UE 115, a second reporting message including an uplink PCRS configuration. Additionally or alternatively, PCRS component 930 may receive, from the UE 115, one or more PCRS based on the uplink PCRS configuration.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
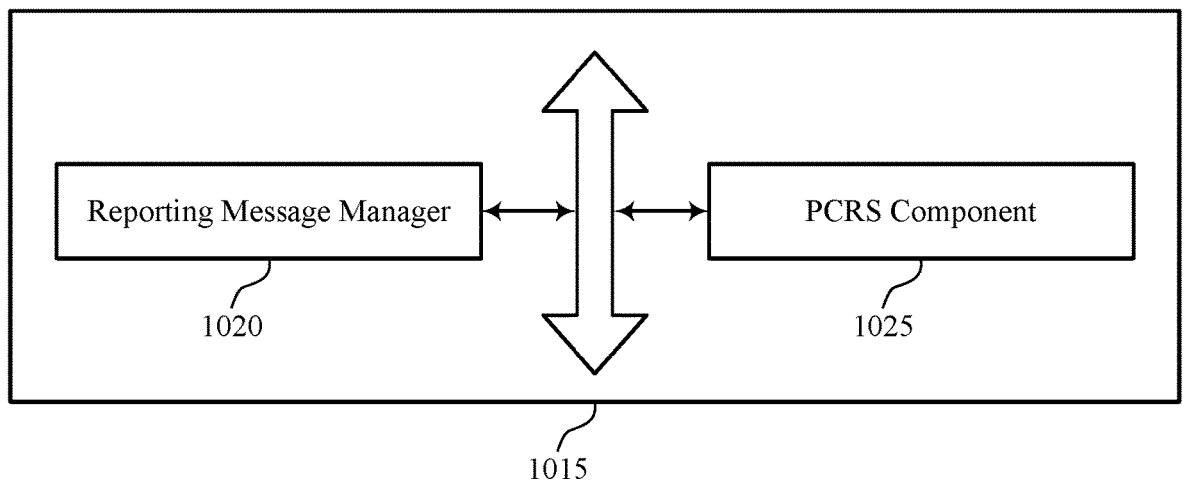

FIG. 10 shows a block diagram 1000 of a base station PCRS manager 1015 that supports PCRS configuration reporting and signaling in accordance with various aspects of the present disclosure. The base station PCRS manager 1015 may be an example of aspects of a base station PCRS manager 1115 described with reference to FIGS. 8, 9, and 11. The base station PCRS manager 1015 may include reporting message manager 1020 and PCRS component 1025. Each of these modules may communicate, directly or indirectly, with one another (e.g., via one or more buses).

Reporting message manager 1020 may receive, from a UE 115, a reporting message including a PCRS configuration. PCRS component 1025 may transmit one or more PCRS based on the PCRS configuration. In some cases, the PCRS configuration includes a resource mapping pattern used for transmitting the one or more PCRS. In some cases, the PCRS configuration includes a number of PCRS ports used for transmitting the one or more PCRS. In some cases, the PCRS configuration includes a multiplexing scheme for one or more PCRS port.

PCRS component 1025 may determine an uplink PCRS configuration, transmit, to the UE 115, a message including the determined uplink PCRS configuration, and receive, from the UE 115, one or more PCRS based on the uplink PCRS configuration. In some cases, PCRS component 1025 may receive, from the UE 115, a second reporting message including an uplink PCRS configuration and receive, from the UE 115, one or more PCRS based on the uplink PCRS configuration.

The multiplexing scheme may include a PCRS precoder corresponding to each of the one or more PCRS ports. In some cases, the PCRS precoder is a same precoder used for a downlink reference signal including a DMRS or a UERS. In some cases, the one or more PCRS ports are mapped to respective DMRS ports. In some cases, the multiplexing scheme includes the one or more PCRS ports multiplexed onto a single resource. In some cases, the multiplexing scheme includes the one or more PCRS ports multiplexed across two or more UEs 115. In some cases, the multiplexing scheme includes a single PCRS port multiplexed over a set of resources.

Figure 11:
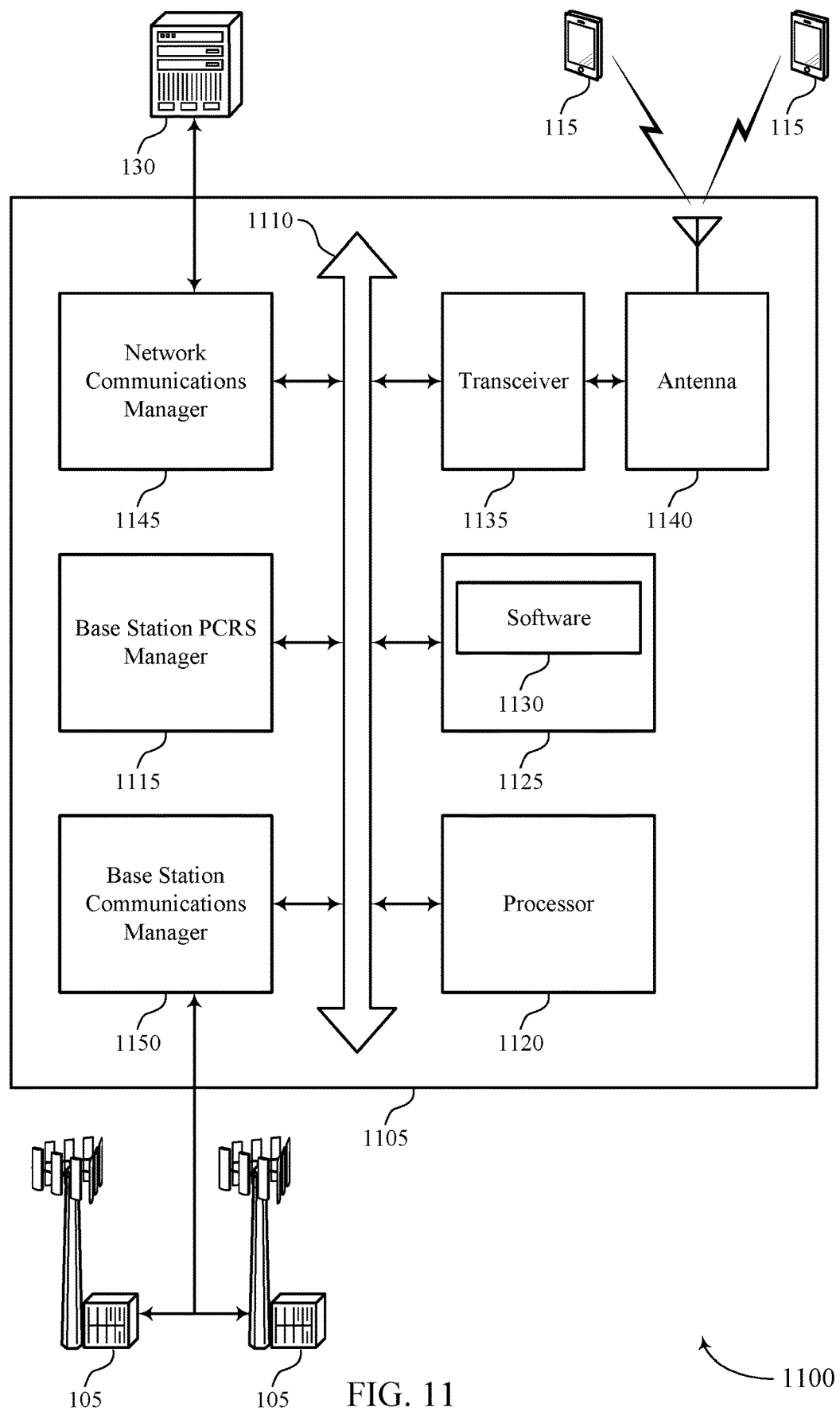
FIG. 11 illustrates a block diagram of a system including a base station that supports PCRS configuration reporting and signaling in accordance with aspects of the present disclosure.

FIG. 11 shows a diagram of a system 1100 including a device 1105 that supports PCRS configuration reporting and signaling in accordance with various aspects of the present disclosure. Device 1105 may be an example of or include the components of base station 105 as described above, e.g., with reference to FIG. 1. Device 1105 may include components for bi-directional voice and data communications including components for transmitting and receiving communications, including base station PCRS manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting PCRS configuration reporting and signaling).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support PCRS configuration reporting and signaling. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions. Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an LTE/LTE-A wireless communication network technology to provide communication between base stations 105.

Figure 12:
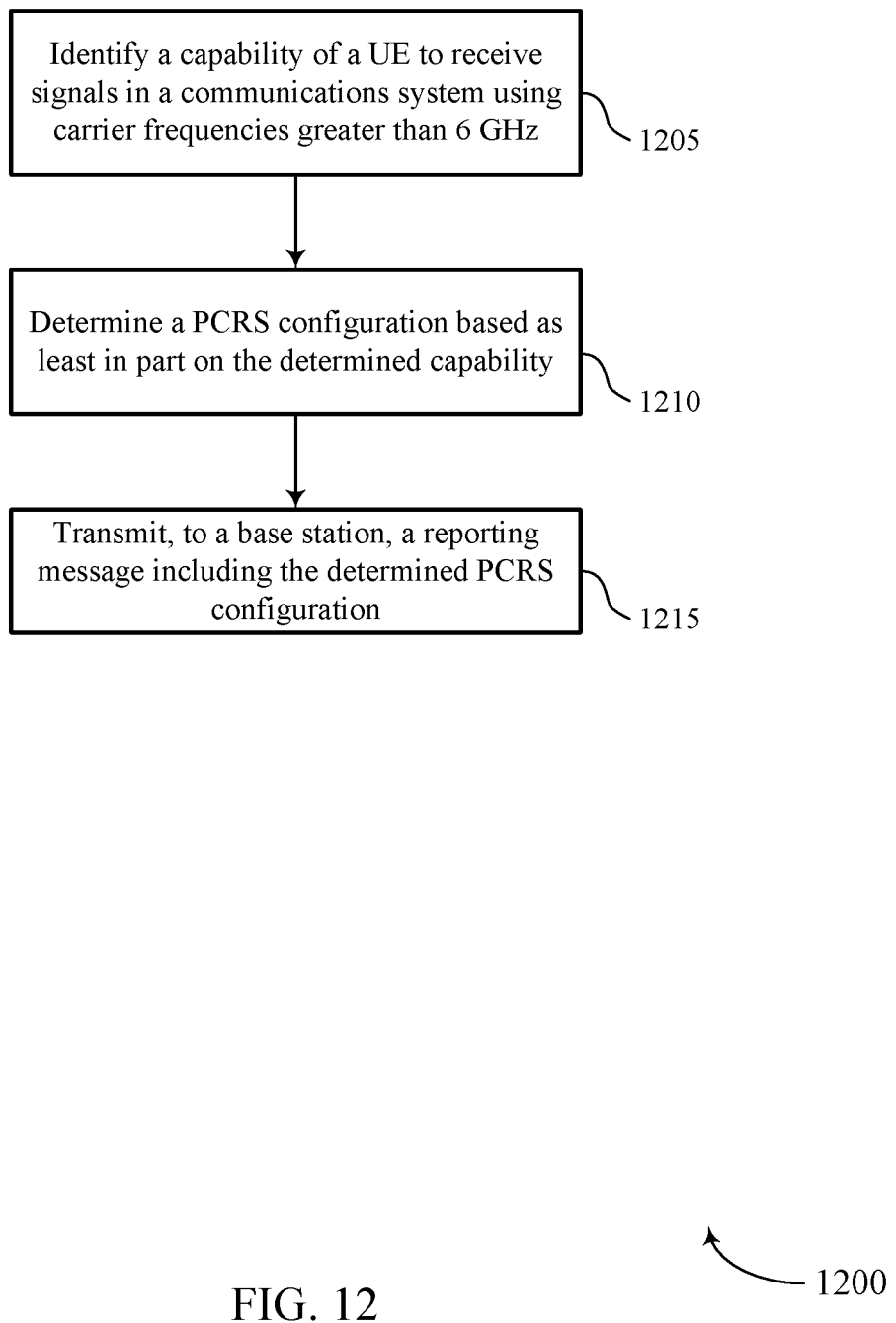
FIGS. 12 through 14 illustrate methods for PCRS configuration reporting and signaling in accordance with aspects of the present disclosure.

FIG. 12 shows a flowchart illustrating a method 1200 for PCRS configuration reporting and signaling in accordance with various aspects of the present disclosure. The operations of method 1200 may be implemented by a UE 115 or its components as described herein. For example, the operations of method 1200 may be performed by a UE PCRS manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify a capability to receive signals in a communications system using carrier frequencies greater than 6 GHz. For example, the communications system may use mmW frequencies. The operations of block 1205 may be performed according to the methods described with reference to FIGS. 1 through 3. In certain examples, aspects of the operations of block 1205 may be performed by a capability manager as described with reference to FIGS. 4 through 7.

At block 1210 the UE 115 may determine a PCRS configuration based as least in part on the identified capability. The operations of block 1210 may be performed according to the methods described with reference to FIGS. 1 through 3. In certain examples, aspects of the operations of block 1210 may be performed by a PCRS configuration manager as described with reference to FIGS. 4 through 7.

At block 1215 the UE 115 may transmit, to a base station 105, a reporting message including the determined PCRS configuration. The operations of block 1215 may be performed according to the methods described with reference to FIGS. 1 through 3. In certain examples, aspects of the operations of block 1215 may be performed by a reporting message component as described with reference to FIGS. 4 through 7.

Figure 13:
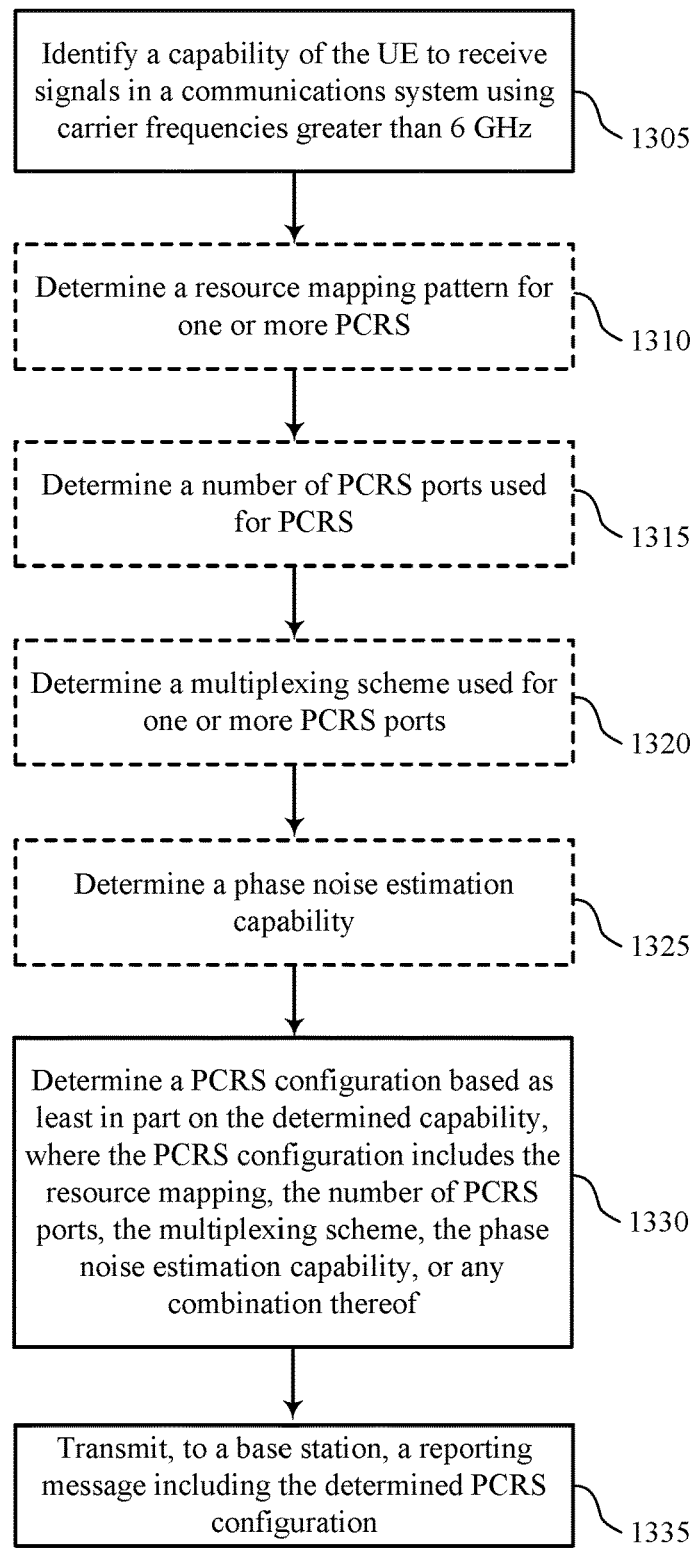

FIG. 13 shows a flowchart illustrating a method 1300 for PCRS configuration reporting and signaling in accordance with various aspects of the present disclosure. The operations of method 1300 may be implemented by a UE 115 or its components as described herein. For example, the operations of method 1300 may be performed by a UE PCRS manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a capability to receive signals in a communications system using carrier frequencies greater than 6 GHz. The operations of block 1305 may be performed according to the methods described with reference to FIGS. 1 through 3. In certain examples, aspects of the operations of block 1305 may be performed by a capability manager as described with reference to FIGS. 4 through 7.

At block 1310 the UE 115 may optionally determine a resource mapping pattern for one or more PCRS. The operations of block 1310 may be performed according to the methods described with reference to FIGS. 1 through 3. In certain examples, aspects of the operations of block 1310 may be performed by a PCRS configuration manager as described with reference to FIGS. 4 through 7.

At block 1315 the UE 115 may optionally determine a number of PCRS ports used for PCRS. The operations of block 1315 may be performed according to the methods described with reference to FIGS. 1 through 3. In certain examples, aspects of the operations of block 1315 may be performed by a PCRS configuration manager as described with reference to FIGS. 4 through 7.

At block 1320 the UE 115 may optionally determine a multiplexing scheme used for one or more PCRS ports. The operations of block 1320 may be performed according to the methods described with reference to FIGS. 1 through 3. In certain examples, aspects of the operations of block 1320 may be performed by a PCRS configuration manager as described with reference to FIGS. 4 through 7.

At block 1325 the UE 115 may optionally determine a phase noise estimation capability. The operations of block 1325 may be performed according to the methods described with reference to FIGS. 1 through 3. In certain examples, aspects of the operations of block 1325 may be performed by a PCRS configuration manager as described with reference to FIGS. 4 through 7.

At block 1330 the UE 115 may determine a PCRS configuration based on the identified capability. The PCRS configuration may include one or more of the resource mapping pattern, the number of PCRS ports, the multiplexing scheme, or the noise estimation capability. The operations of block 1330 may be performed according to the methods described with reference to FIGS. 1 through 3. In certain examples, aspects of the operations of block 1330 may be performed by a PCRS configuration manager as described with reference to FIGS. 4 through 7.

At block 1335 the UE 115 may transmit, to a base station, a reporting message including the determined PCRS configuration. The operations of block 1335 may be performed according to the methods described with reference to FIGS. 1 through 3. In certain examples, aspects of the operations of block 1335 may be performed by a reporting message component as described with reference to FIGS. 4 through 7.

Figure 14:
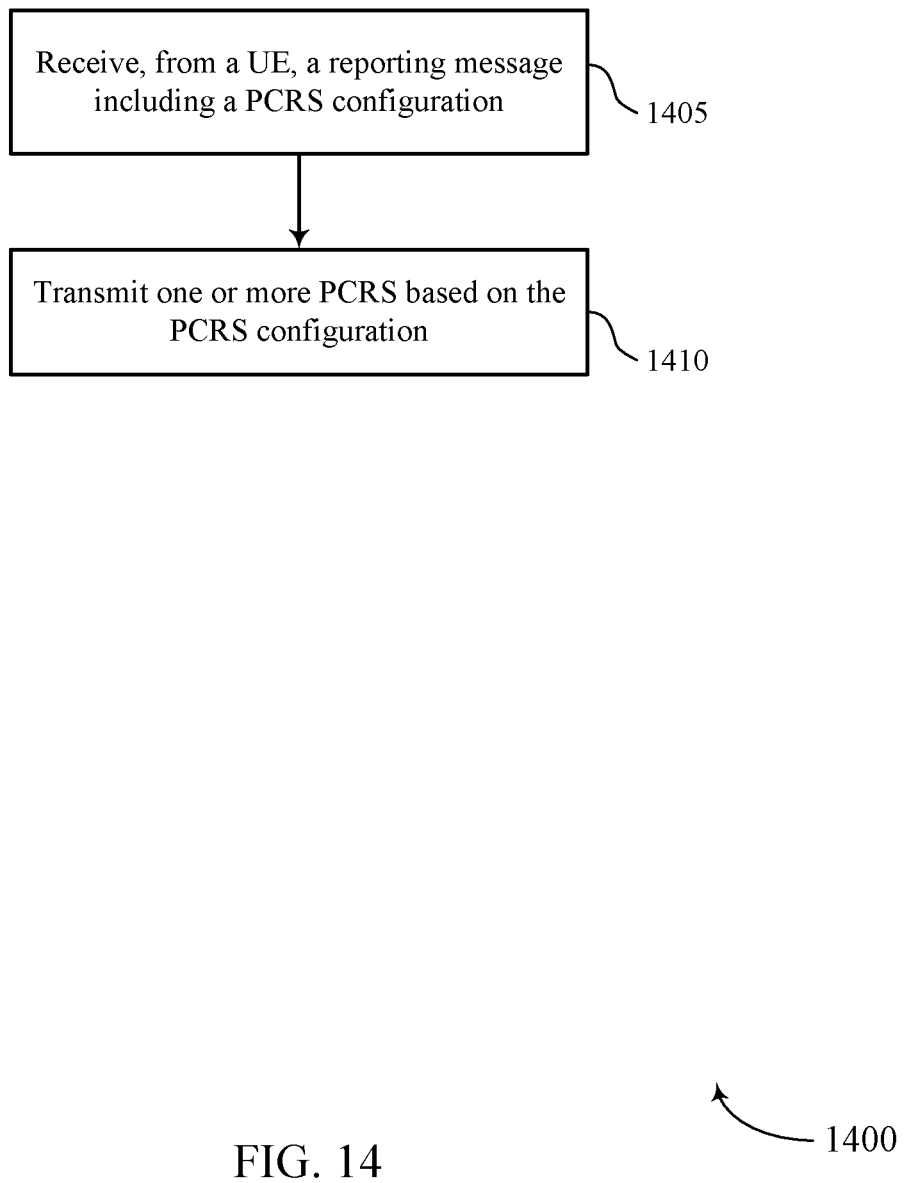

FIG. 14 shows a flowchart illustrating a method 1400 for PCRS configuration reporting and signaling in accordance with various aspects of the present disclosure. The operations of method 1400 may be implemented by a base station 105 or its components as described herein. For example, the operations of method 1400 may be performed by a base station PCRS manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1405 the base station 105 may receive, from a UE 115, a reporting message including a PCRS configuration. The operations of block 1405 may be performed according to the methods described with reference to FIGS. 1 through 3. In certain examples, aspects of the operations of block 1405 may be performed by a reporting message manager as described with reference to FIGS. 8 through 11.

At block 1410 the base station 105 may transmit one or more PCRS based on the PCRS configuration. The operations of block 1410 may be performed according to the methods described with reference to FIGS. 1 through 3. In certain examples, aspects of the operations of block 1410 may be performed by a PCRS component as described with reference to FIGS. 8 through 11.

In some examples, aspects from two or more of the methods 1200, 1300, or 1400 described with reference to FIG. 12, 13, or 14 may be combined. It should be noted that the methods 1200, 1300, and 1400 are just example implementations, and that the operations of the methods 1200, 1300, or 1400 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, a remote radio head (RRH), or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   receiving, from a user equipment (UE), a reporting message comprising a phase-noise compensation reference signal (PCRS) configuration, wherein the PCRS configuration is based at least in part on a capability of the UE to receive PCRS and comprises a number of PCRS ports used for transmitting one or more PCRS; and
   transmitting the one or more PCRS based at least in part on the PCRS configuration.

2. The method of claim 1, further comprising:
   determining an uplink PCRS configuration;
   transmitting, to the UE, a message comprising the determined uplink PCRS configuration; and
   receiving, from the UE, one or more PCRS based at least in part on the uplink PCRS configuration.

3. The method of claim 1, further comprising:
   receiving, from the UE, a second reporting message comprising an uplink PCRS configuration; and
   receiving, from the UE, one or more PCRS based at least in part on the uplink PCRS configuration.

4. The method of claim 1, wherein the PCRS configuration further comprises a resource mapping pattern used for transmitting the one or more PCRS.

5. The method of claim 1, wherein the PCRS configuration further comprises a multiplexing scheme for one or more PCRS ports.

6. The method of claim 5, wherein the multiplexing scheme comprises a PCRS precoder corresponding to each of the one or more PCRS ports.

7. The method of claim 6, wherein the PCRS precoder is a same precoder used for a downlink reference signal comprising a demodulation reference signal (DMRS) or a UE-specific reference signal (UERS).

8. The method of claim 6, wherein the one or more PCRS ports are mapped to respective demodulation reference signal (DMRS) ports.

9. The method of claim 5, wherein the multiplexing scheme comprises the one or more PCRS ports multiplexed onto a set of one or more resources.

10. An apparatus for wireless communication at a base station, in a system comprising:
    a processor;

memory in electronic communication with the processor; and instructions stored in the memory and operable, when executed by the processor, to cause the apparatus to:

receive, from a user equipment (UE), a reporting message comprising a phase-noise compensation reference signal (PCRS) configuration, wherein the PCRS configuration is based at least in part on a capability of the UE to receive PCRS and comprises a number of PCRS ports used for transmitting one or more PCRS; and transmit the one or more PCRS based at least in part on the PCRS configuration.

11. The apparatus of claim 10, wherein the instructions are further executable by the processor to cause the apparatus to:

determine an uplink PCRS configuration;

transmit, to the UE, a message comprising the determined uplink PCRS configuration; and receive, from the UE, one or more PCRS based at least in part on the uplink PCRS configuration.

12. The apparatus of claim 10, wherein the instructions are further executable by the processor to cause the apparatus to:

receive, from the UE, a second reporting message comprising an uplink PCRS configuration; and receive, from the UE, one or more PCRS based at least in part on the uplink PCRS configuration.

13. The apparatus of claim 10, wherein the PCRS configuration further comprises a resource mapping pattern used for transmitting the one or more PCRS.

14. The apparatus of claim 10, wherein the PCRS configuration further comprises a multiplexing scheme for one or more PCRS ports.

15. The apparatus of claim 14, wherein the multiplexing scheme comprises a PCRS precoder corresponding to each of the one or more PCRS ports.

16. The apparatus of claim 15, wherein the PCRS precoder is a same precoder used for a downlink reference signal comprising a demodulation reference signal (DMRS) or a UE-specific reference signal (UERS).

17. The apparatus of claim 15, wherein the one or more PCRS ports are mapped to respective demodulation reference signal (DMRS) ports.

18. The apparatus of claim 14, wherein the multiplexing scheme comprises the one or more PCRS ports multiplexed onto a set of one or more resources.

19. An apparatus for wireless communication at a base station, comprising:

means for receiving, from a user equipment (UE), a reporting message comprising a phase-noise compensation reference signal (PCRS) configuration, wherein the PCRS configuration is based at least in part on a capability of the UE to receive PCRS and comprises a number of PCRS ports used for transmitting one or more PCRS; and means for transmitting the one or more PCRS based at least in part on the PCRS configuration.

20. The apparatus of claim 19, further comprising:

means for determining an uplink PCRS configuration;

means for transmitting, to the UE, a message comprising the determined uplink PCRS configuration; and means for receiving, from the UE, one or more PCRS based at least in part on the uplink PCRS configuration.

* * * * *